(12) United States Patent
Griessbaum et al.

(10) Patent No.: US 12,359,957 B2
(45) Date of Patent: Jul. 15, 2025

(54) ELECTRONIC UNIT FOR A FILL LEVEL MEASURING PROBE

(71) Applicant: VEGA GRIESHABER KG, Wolfach (DE)

(72) Inventors: Karl Griessbaum, Muhlenbach (DE); Holger Staiger, Hardt (DE); Siegbert Woehrle, Schiltach (DE)

(73) Assignee: VEGA GRIESHABER KG, Wolfach (DE)

( * ) Notice: Subject to any disclaimer, the term of this patent is extended or adjusted under 35 U.S.C. 154(b) by 444 days.

(21) Appl. No.: 17/759,349

(22) PCT Filed: Jan. 5, 2021

(86) PCT No.: PCT/EP2021/050057
§ 371 (c)(1),
(2) Date: Jul. 22, 2022

(87) PCT Pub. No.: WO2021/148247
PCT Pub. Date: Jul. 29, 2021

(65) Prior Publication Data
US 2023/0048795 A1    Feb. 16, 2023

(30) Foreign Application Priority Data

Jan. 24, 2020 (DE) .................... 10 2020 200 866.3
Jan. 24, 2020 (DE) .................... 10 2020 200 879.5

(51) Int. Cl.
*G01F 23/26*    (2022.01)
*G01F 23/263*   (2022.01)
*G01F 23/80*    (2022.01)

(52) U.S. Cl.
CPC .......... *G01F 23/266* (2013.01); *G01F 23/802* (2022.01)

(58) Field of Classification Search
CPC ....... G01F 23/266; G01F 23/802; G01F 23/80
See application file for complete search history.

(56) References Cited

U.S. PATENT DOCUMENTS 5,532,527 A     7/1996 Zatler et al.
10,416,020 B2   9/2019 Wernet et al.
(Continued)

FOREIGN PATENT DOCUMENTS

CN        207946134 U    10/2018
DE  10 2014 107 927 A1   12/2015
(Continued)

OTHER PUBLICATIONS

International Preliminary Report on Patentability and Written Opinion issued Jul. 26, 2022, in PCT/EP2021/050057, 7 pages.
(Continued)

*Primary Examiner* — Francis C Gray
(74) *Attorney, Agent, or Firm* — Oblon, McClelland, Maier & Neustadt, L.L.P.

(57) ABSTRACT

An electronic device for a level measurement probe for measuring a level of a medium is provided, including: at least one first excitation electronic device configured to emit a first excitation signal; and at least one second excitation electronic device configured to emit a second excitation signal, the first excitation signal and the second excitation signal being different, and the electronic unit being configured to emit the first excitation signal and the second excitation signal simultaneously to the level measurement probe.

20 Claims, 1 Drawing Sheet

(56) References Cited

U.S. PATENT DOCUMENTS

Figure 1:
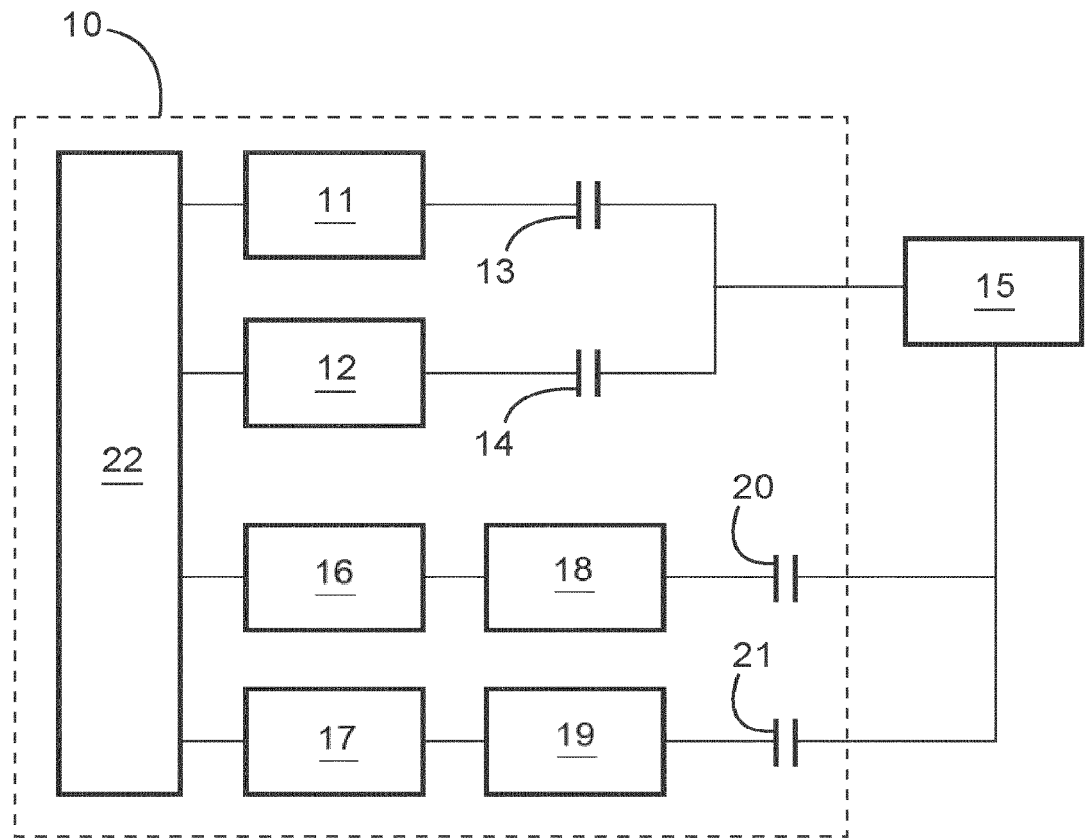

| | | | |
|---|---|---|---|
| 10,983,069 B2 | 4/2021 | Blödt et al. | |
| 2005/0071113 A1 | 3/2005 | Heilig | |
| 2008/0042658 A1 | 2/2008 | Getman et al. | |
| 2010/0147069 A1* | 6/2010 | Grozinger | G01F 23/2962 |
| | | | 73/290 V |
| 2017/0115153 A1* | 4/2017 | Wernet | G01F 23/268 |
| 2018/0364090 A1* | 12/2018 | Sala | G01F 23/802 |
| 2019/0201902 A1 | 7/2019 | Fobel et al. | |
| 2021/0033446 A1 | 2/2021 | Claes et al. | |
| 2021/0293738 A1* | 9/2021 | Ott | G01N 27/226 |

FOREIGN PATENT DOCUMENTS

| | | | |
|---|---|---|---|
| DE | 10 2017 130 728 A1 | 6/2019 | |
| EP | 1 794 552 A2 | 6/2007 | |
| EP | 1 882 914 A2 | 1/2008 | |
| EP | 2069731 B1 * | 1/2013 | G01F 23/263 |
| EP | 3 152 530 A | 12/2015 | |
| EP | 3 165 883 A1 | 5/2017 | |
| WO | WO 2019/154874 A1 | 8/2019 | |

OTHER PUBLICATIONS

Germany Office Action issued Sep. 11, 2020 in German Patent Application No. 10 2020 200 879.5, 5 pages.

International Search Report and Written Opinion issued Apr. 16, 2021 in PCT/EP2021/050057 (with English Translation of Written Opinion only), 21 pages.

International Search Report mailed on Apr. 16, 2021 in PCT/EP2021/050057 filed on Jan. 5, 2021, 2 pages).

* cited by examiner

ELECTRONIC UNIT FOR A FILL LEVEL MEASURING PROBE

REFERENCE TO RELATED APPLICATIONS

This application is a U.S. national stage application of PCT/EP2021/050057, filed on Jan. 5, 2021, which is based upon and claims the benefit of priority under 35 U.S.C. § 119 to German Patent Application No. 10 2020 200 879.5, and to German Patent Application No. 10 2020 200 866.3, filed Jan. 24, 2020, the entire contents of each of which are incorporated herein by reference in their entirety.

FIELD OF THE INVENTION

The present invention relates to an electronic unit for a level measurement probe, a level measurement probe comprising such an electronic unit, and the use of an electronic unit in a level measurement probe.

BACKGROUND

A level or limit level may be monitored, for example, by means of a conductive measuring method. For this purpose, conductivity measurements are taken in the filling medium. The level or limit level can also be monitored by means of a capacitive measuring method. In this case, the level is determined from the capacitance formed by a measuring electrode and, for example, the wall of the vessel or a reference electrode.

The areas of application for these two measuring methods can be different. For example, it is crucial for the conductive measuring method that the filling medium has a certain minimum conductivity. A very high conductivity, on the other hand, can lead to problems with capacitive level measurement, for example if the electrodes of the level measurement probe are bare electrodes. Adhesions on the probe can also have different effects.

It has now become apparent that there is a further need to provide an improved electronic unit for a level measurement probe.

It is therefore an object of the present invention to provide an improved electronic unit for a level measurement probe. These and other objects, which will still be mentioned when reading the following description or which may be recognized by the person skilled in the art, are solved by the subject matter of the independent claims. The dependent claims further form the central idea of the present invention in a particularly advantageous manner.

SUMMARY OF THE INVENTION

The present invention provides an electronic unit for a level measurement probe for measuring a level of a medium, comprising: at least one first excitation electronic unit configured to emit a first excitation signal; at least one second excitation electronic unit configured to emit a second excitation signal; wherein the first excitation signal and the second excitation signal are different; and wherein the electronic unit is configured to emit the first excitation signal and the second excitation signal simultaneously to a level measurement probe.

In other words, the present invention proposes to provide an electronic unit with which two measurement methods can be performed simultaneously. The excitation signals can thereby be emitted to a level measurement probe as individual excitation signals or also as a combined excitation signal.

Preferably, the at least first excitation electronic unit is configured to emit the first excitation signal for a conductive level measurement and wherein the at least second excitation electronic unit is preferably configured to emit the second excitation signal for a capacitive level measurement. In this context, it should be noted that the present invention is not, however, limited to a combination of a conductive and a capacitive measurement, even though such a combination is particularly preferred. Rather, the same or different measurement principles may be used in the present invention.

Advantageously, the first excitation signal and the second excitation signal have different frequencies. Furthermore, it is preferred that the first excitation electronic unit is configured to emit a square wave signal and/or a sinusoidal signal as the first excitation signal, preferably for a conductive level measurement, wherein the square wave signal and/or the sinusoidal signal is/are preferably emitted at a frequency of 5 kHz. Furthermore, it is preferred that the second excitation electronic unit is configured to emit a triangular signal and/or a sinusoidal signal and/or a square-wave signal as a second excitation signal, preferably for a capacitive level measurement, wherein the triangular signal and/or the sinusoidal signal and/or the square-wave signal is/are preferably emitted with a frequency of 355 kHz.

Preferably, the first excitation electronic unit and/or the second excitation electronic unit comprises at least one Direct Digital Synthesis (DDS; "Direct Digital Synthesis") unit to provide the first excitation signal and/or the second excitation signal.

Advantageously, the first excitation electronic unit and the second excitation electronic unit are configured to emit the first excitation signal and the second excitation signal in such a way that the first excitation signal and the second excitation signal have the same arithmetic mean value. In this way, for example, offset differences can already be avoided within the scope of the excitation electronics, so that this advantageously does not have to be taken into account by the evaluation electronics.

Preferably, the electronic unit further comprises at least one first evaluation electronic unit for evaluating a conductive level measurement and/or at least one second evaluation electronic unit for evaluating a capacitive level measurement, wherein a combined output signal of the level measurement probe is present as input signal of the first evaluation electronic unit and/or the second evaluation electronic unit.

In this context, it is preferred that the first electronic evaluation unit is assigned a first filter unit which is configured to filter a first output signal for a conductive level measurement from the combined output signal; and/or wherein the second electronic evaluation unit is assigned a second filter unit which is configured to filter a second output signal for a capacitive level measurement from the combined output signal. In this context, it is further preferred that the first filter unit is provided as a digital filter unit comprising at least one bandpass filter unit whose center frequency corresponds to the first excitation signal; and/or wherein the second filter unit is provided as a digital filter unit comprising at least one bandpass filter unit whose center frequency corresponds to the second excitation signal. In such an evaluation, therefore, no switching arrangement is necessary in the receiving branch, which switches back and forth between a conductive and a capacitive signal. However, the evaluation is not limited to such an embodiment; it can be performed, for example, via a processor unit and/or an evaluation electronic unit of analog design. Furthermore, units for performing a continuous Fourier transform for an analog combined output signal of a level measurement probe and/or for performing a discrete Fourier transform for a digital combined output signal can be provided alternatively or additionally. Advantageously, the electronic unit comprises at least a first digital-to-analog converter unit configured to convert at least a digital excitation signal of the electronic unit into an analog excitation signal that can be emitted as an analog excitation signal to the level measurement probe. Depending on the assembling of a level measurement probe, two independent excitation signals can be emitted to the level measurement probe or a single combined excitation signal. In this context, it should be noted that the present invention is not limited to a particular analog-digital assembling. Rather, the entire signaling may be analog or digital. Analog-digital combinations can also be used with the use of appropriate analog-digital converter units. Such converter units can thereby usually convert signals from analog to digital and vice versa, so that in the following both the terms analog-digital converter unit and digital-analog converter unit are used without excluding any particular conversion direction.

Preferably, the electronic unit comprises at least a second analog-to-digital converter unit configured to convert at least a combined analog output signal of the level measurement probe into a digital combined output signal that can be emitted as a digital combined output signal to the two evaluation electronic units.

Preferably, the electronic unit comprises a weighting unit which is configured to weight the measurement results of a conductive level measurement and a capacitive level measurement depending on a medium-specific property of the medium whose level is detected, wherein the medium-specific property is preferably the electrical conductivity and/or the dielectric constant of the medium whose level is detected. This makes it possible to adapt the measurement results of the electronic unit to the extent that a measurement method that is more suitable for a particular medium and/or for particular ambient conditions is given greater influence on the measurement result. In this context, it is particularly preferred that the one or more medium-specific properties are determined from a test signal and/or a calibration signal. For example, it is possible here to emit and evaluate such a test and/or calibration signal at regular intervals so that the electronic unit can automatically adapt to possibly changing ambient conditions and/or different media. Such a test signal can thereby also be provided by a regular measurement. It can also be provided that one of the two excitation signals is deactivated and, if necessary, also the corresponding components of the electronic unit are deactivated, which are required for such a measurement procedure, if an evaluation of the test and/or calibration signal shows that one of the two measurement procedures does not provide meaningful measurement results, for example because the conductivity of the filling medium is too low or too high, so that either the conductive or the capacitive measurement cannot provide meaningful results. In this case, it can also be provided that a deactivated measuring method is switched on (activated) again (on a trial basis) under certain circumstances or even after a certain time has elapsed, in order to be able to decide subsequently whether the conditions have changed and this measuring method can be carried out again in a meaningful way. This can save energy and time, since it is not necessary to evaluate both measuring procedures if one of the two measuring procedures cannot provide meaningful measurement results. In this context, it is also possible for an operator to manually deactivate one of the two measuring methods, so that the electronic unit in this case only measures according to one measuring method.

Furthermore, the present invention relates to a level measuring sensor or a level measuring device for measuring a level, comprising at least one electronic unit described above. The term level measuring sensor is to be understood broadly in the present context and includes all devices with which a level and/or a limit level of a medium in a container, a pipe, a basin or the like can be detected.

Finally, the present invention relates to the use of an electronic unit described above in a level measurement sensor or level measurement device for measuring a level.

DESCRIPTION OF A PREFERRED EMBODIMENT

In the following a detailed description of the figures is given, therein shows

Figure 2:
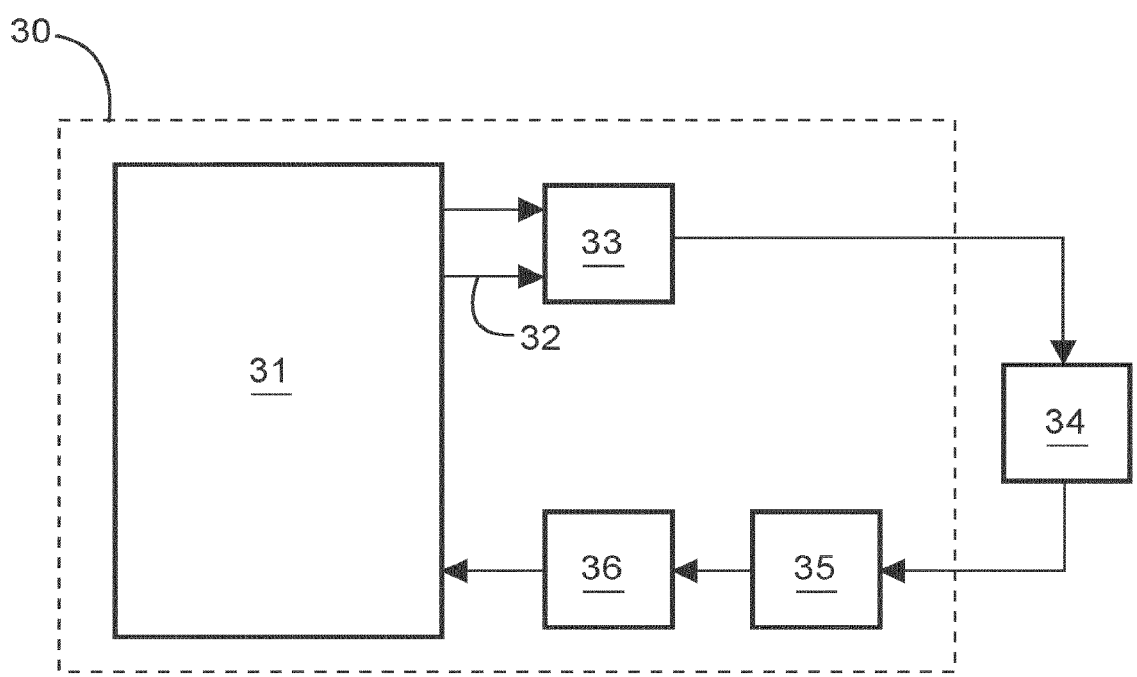

FIG. 1 a schematic view of a preferred embodiment of an electronic unit for a level sensor according to the invention; and FIG. 2 a schematic view of a further preferred embodiment of an electronic unit according to the invention.

FIG. 1 shows a schematic view of a preferred embodiment of an electronic unit 10 according to the invention for a level measurement sensor or a level measurement device.

The electronic unit 10 comprises a first excitation electronic unit 11 for generating a first excitation signal for a conductive level measurement. In the preferred embodiment, the first excitation signal is a digital square wave signal or a digital sinusoidal signal with a frequency of 5 kHz. Furthermore, the electronic unit comprises a second excitation electronic unit 12 for generating a second excitation signal for a capacitive level measurement. In the preferred embodiment, the second excitation signal is a digital triangular, sine or square wave signal with a frequency of 355 kHz. The excitation signals can, for example, be emitted by the electronic units in such a way that the first excitation signal and the second excitation signal have the same arithmetic mean value, wherein such averaging can also be carried out by corresponding capacitors, for example the capacitors 13, 14 shown in FIG. 1 or the capacitors 20, 21 shown in FIG. 2. This is particularly preferred if both excitation signals are emitted as a combined excitation signal, since this avoids large offset differences.

The excitation electronic units 11, 12 may comprise, for example, a Direct Digital Synthesis (DDS; "Direct Digital Synthesis") unit to provide the digital excitation signals. However, the present invention is not limited to digital signal generation. Although in the embodiment shown the excitation electronic units 11, 12 are separate units, these may also be combined into an integral unit. As shown in FIG. 1, galvanic isolation in the form of capacitors 13, 14 can also be provided in the signal path.

The excitation signals can then be emitted simultaneously to a level measurement probe 15, wherein the excitation signals can be emitted to the level measurement probe 15 as a combined excitation signal or as separate excitation signals. Also, the excitation signals can thereby be emitted to the level measurement probe 15 in digital or analog form.

Finally, in the preferred embodiment shown, the electronic unit 10 also comprises a first electronic evaluation unit 16 for evaluating a conductive level measurement a second electronic evaluation unit 17 for evaluating a capacitive level measurement, wherein a combined output signal of the level measurement probe 15 is present as the input signal of the first electronic evaluation unit 16 and of the second electronic evaluation unit 18. The signals of the level measurement probe 15 are basically emitted in analog from the level measurement probe 15. However, it is also possible to assign an analog-to-digital converter unit to the level measurement probe 15 so that the combined output signal can also be provided digitally. As shown in FIG. 1, the first electronic evaluation unit 16 has a first filter unit 18 configured to filter a first output signal for conductive level measurement from the combined output signal. A second filter unit 19 is assigned to the second electronic evaluation unit 17, which is configured to filter a second output signal for a capacitive level measurement from the combined output signal.

The first filter unit 18 can be provided, for example, as a digital filter unit comprising at least one bandpass filter unit whose center frequency corresponds to the first excitation signal. The second filter unit 19 can also be provided as a digital filter unit comprising at least one bandpass filter unit whose center frequency corresponds to the second excitation signal. However, the evaluation of the output signals of the level measurement sensor 15 is not limited to such an embodiment; it can also be carried out, for example, via a processor unit and/or via an evaluation electronic unit of analog design. Furthermore, units for performing a continuous Fourier transform for an analog combined output signal of a level measurement probe or for performing a discrete Fourier transform for a digital combined output signal can be provided alternatively or additionally. The signals from the electronic evaluation units 16, 18 can then be forwarded to an output unit 22 and/or a further processing unit which derives, for example, a specific filling level of a container from the signals from the electronic evaluation units 16, 18.

Furthermore, it should be noted that more than two excitation signals and also more than two evaluation electronic units with different filter units can be provided. The present invention is therefore not limited to the two exemplarily indicated excitation signals and the two exemplarily indicated evaluation electronic units.

FIG. 2 shows a second preferred embodiment of an electronic unit 30 according to the present invention. In this embodiment, a first digital-to-analog converter 33 is additionally associated with the electronic unit 30, by means of which the two excitation signals 32 shown here, which are generated in an excitation and evaluation electronic unit 31, can be converted into a combined analog excitation signal and emitted to a level measurement probe 34. The excitation and evaluation electronic unit 31 may comprise, for example, a microcontroller with corresponding peripherals and software. The excitation and evaluation electronic unit 31 can be assembled, for example, as shown in FIG. 1. In addition, the electronic unit 30 can be assigned, for example, a further electronic unit 35 for performing a Fourier transformation, which transforms the analog combined output signal of the level measurement probe 34 before it is fed in the following, for example, to a second analog-to-digital converter 36 and is then fed into the excitation and evaluation electronic unit 31 for further evaluation.

In this regard, it should be noted that the present invention is not limited to any particular analog-to-digital assembling. Rather, the entire signaling may be analog or digital. Analog-digital combinations can also be used with the use of appropriate analog-digital converter units. It is also possible, instead of the predominantly digital design shown in FIG. 2, to carry out either only the filtering of the output signal of the level measurement probe or also only the formation of the excitation signal digitally.

However, the present invention is not limited to the foregoing preferred embodiments as long as it is encompassed by the subject matter of the following claims. It is further noted that the terms "comprising" and "comprising" do not exclude other elements or steps, and the indefinite articles "one" or "a" do not exclude a plurality. Furthermore, the term unit is to be understood broadly, and in particular this term is not to be understood to mean that the respective units must be integral components. Also, the respective units may also be positioned differently. Finally, different units may also be combined in one assembly. Furthermore, it is pointed out that features or steps that have been described with reference to one of the above embodiments may also be used in combination with other features or steps of other embodiments described above.

REFERENCE LIST

10 first embodiment of an electronic unit according to the invention
11 first excitation electronic unit
12 second excitation electronic unit
13 capacitor
14 capacitor
15 level measurement probe
16 first electronic evaluation unit
17 second electronic evaluation unit
18 first filter unit
19 second filter unit
20 capacitor
21 capacitor
22 output unit
30 second embodiment of an electronic unit according to the invention
31 exciter and evaluation electronic unit
32 exciter signals
33 analog-to-digital converter unit/digital-to-analog converter unit
34 level measurement probe
35 electronic unit (Fourier transform)
36 analog-to-digital converter unit/digital-to-analog converter unit

The invention claimed is:

1. An electronic unit for a level measurement probe for measuring a level of a medium, comprising:
at least one first excitation electronic unit configured to emit a first excitation signal; and
at least one second excitation electronic unit configured to emit a second excitation signal,
wherein the first excitation signal and the second excitation signal are different,
wherein the electronic unit is configured to emit the first excitation signal and the second excitation signal simultaneously to the level measurement probe, and
wherein the first excitation signal and the second excitation signal have different frequencies.

2. The electronic unit according to claim 1,
wherein the at least one first excitation electronic unit is further configured to emit the first excitation signal for a conductive level measurement, and
wherein the at least one second excitation electronic unit is further configured to emit the second excitation signal for a capacitive level measurement.

3. The electronic unit according to claim 1,
wherein the at least one first excitation electronic unit is further configured to emit a square wave signal and/or a sinusoidal signal as a first excitation signal.

4. The electronic unit according to claim 3,
wherein the at least one first excitation electronic unit is further configured to emit the square wave signal and/or the sinusoidal signal as the first excitation signal for conductive level measurement, and
wherein the square wave signal and/or the sinusoidal signal is emitted at a frequency of 5 kHz.

5. The electronic unit according to claim 1,
wherein the at least one second excitation electronic unit is further configured to emit a triangular signal and/or a sinusoidal signal and/or a square-wave signal as a second excitation signal.

6. The electronic unit according to claim 5,
wherein the at least one second excitation electronic unit is further configured to emit the triangular signal and/or the sinusoidal signal and/or the square-wave signal as the second excitation signal for a capacitive level measurement, and
wherein the triangular signal and/or the sinusoidal signal and/or the square-wave signal is emitted with a frequency of 355 kHz.

7. The electronic unit according to claim 1, wherein the at least one first excitation electronic unit and/or the at least one second excitation electronic unit comprises at least one Direct Digital Synthesis (DDS) unit to provide the first excitation signal and/or the second excitation signal.

8. The electronic unit according to claim 1, wherein the at least one first excitation electronic unit and the at least one second excitation electronic unit are further configured to emit the first excitation signal and the second excitation signal such that the first excitation signal and the second excitation signal have the same arithmetic mean value.

9. The electronic unit according to claim 1,
further comprising at least one first evaluation electronic unit configured to evaluate a conductive level measurement, and/or at least one second evaluation electronic unit configured to evaluate a capacitive level measurement,
wherein a combined output signal of the level measurement probe is present as input signal of the at least one first evaluation electronic unit and/or of the at least one second evaluation electronic unit.

10. The electronic unit according to claim 9,
wherein the at least one first evaluation electronic unit is assigned a first filter unit, which is configured to filter a first output signal for a conductive level measurement from the combined output signal, and/or
wherein the at least one second evaluation electronic unit is assigned a second filter unit, which is configured to filter a second output signal for a capacitive level measurement from the combined output signal.

11. The electronic unit according to claim 9,
wherein the first filter unit is provided as a digital filter unit comprising at least one bandpass filter unit having a center frequency corresponding to the first excitation signal, and/or
wherein the second filter unit is provided as a digital filter unit comprising at least one bandpass filter unit having a center frequency corresponding to the second excitation signal.

12. The electronic unit according to claim 1, further comprising at least a first digital-to-analog converter unit configured to convert at least a digital excitation signal of the electronic unit into an analog excitation signal to be emitted as an analog excitation signal to the level measurement probe.

13. The electronic unit according to claim 1, further comprising:
at least one first evaluation electronic unit configured to evaluate a conductive level measurement, and/or at least one second evaluation electronic unit configured to evaluate a capacitive level measurement; and
at least a second analog-to-digital converter unit configured to convert an analog output signal of the level measurement probe into a digital output signal to be emitted as a digital output signal to the at least one first evaluation electronic unit and/or the at least one second evaluation electronic unit.

14. The electronic unit according to claim 1, further comprising a weighting unit configured to
weight measurement results of a conductive level measurement and of a capacitive level measurement in dependence on a medium-specific property of the medium whose level is detected, and
deactivate one of the first excitation signal and the second excitation signal.

15. The electronic unit according to claim 14, wherein the medium-specific property is an electrical conductivity and/or a dielectric constant of the medium whose level is detected.

16. The electronic unit according to claim 14, wherein one or more media-specific properties are determined from a test signal and/or from a calibration signal.

17. A level measurement probe for measuring a level, comprising at least one electronic unit according to claim 1.

18. The electronic unit according to claim 1, where in the electronic unit is configured to be in a level measurement sensor for measuring a level.

19. An electronic unit for a level measurement probe for measuring a level of a medium, comprising:
at least one first excitation electronic unit configured to emit a first excitation signal; and
at least one second excitation electronic unit configured to emit a second excitation signal,
wherein the first excitation signal and the second excitation signal are different,
wherein the electronic unit is configured to emit the first excitation signal and the second excitation signal simultaneously to the level measurement probe,
wherein the at least one first excitation electronic unit is further configured to emit a square wave signal and/or a sinusoidal signal as the first excitation signal for conductive level measurement, and
wherein the square wave signal and/or the sinusoidal signal is emitted at a frequency of 5 kHz.

20. An electronic unit for a level measurement probe for measuring a level of a medium, comprising:
at least one first excitation electronic unit configured to emit a first excitation signal; and
at least one second excitation electronic unit configured to emit a second excitation signal,
wherein the first excitation signal and the second excitation signal are different,
wherein the electronic unit is configured to emit the first excitation signal and the second excitation signal simultaneously to the level measurement probe,
wherein the at least one second excitation electronic unit is further configured to emit a triangular signal and/or a sinusoidal signal and/or a square-wave signal as a second excitation signal for a capacitive level measurement, and
wherein the triangular signal and/or the sinusoidal signal and/or the square-wave signal is emitted with a frequency of 355 kHz.

* * * * *